United States Patent
Ghosh et al.

(10) Patent No.: US 9,286,104 B1
(45) Date of Patent: Mar. 15, 2016

(54) SELECTING VIRTUAL MACHINES TO BE RELOCATED BASED ON MEMORY VOLATILITY

(71) Applicant: International Business Machines Corporation, Armonk, NY (US)

(72) Inventors: Rahul Ghosh, Morrisville, NC (US); Ivan M. Heninger, Selma, NC (US); Saju Mathew, Austin, TX (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/589,870

(22) Filed: Jan. 5, 2015

(51) Int. Cl.
*G06F 9/455* (2006.01)

(52) U.S. Cl.
CPC .... *G06F 9/45558* (2013.01); *G06F 2009/4557* (2013.01); *G06F 2009/45591* (2013.01)

(58) Field of Classification Search
CPC .......................... G06F 9/45533; G06F 9/5077
USPC .............................. 718/1, 100, 103, 104, 105
See application file for complete search history.

(56) References Cited

U.S. PATENT DOCUMENTS

| | | | |
|---|---|---|---|
| 8,615,579 B1 | 12/2013 | Vincent et al. | |
| 8,892,610 B1 * | 11/2014 | Pang ................... | G06F 12/0253 707/813 |
| 2005/0193258 A1 * | 9/2005 | Sutton ................. | G06F 11/3409 714/32 |
| 2007/0234342 A1 | 10/2007 | Flynn, Jr. et al. | |
| 2009/0300614 A1 | 12/2009 | Shimogawa | |
| 2010/0115049 A1 * | 5/2010 | Matsunaga ........... | G06F 3/0626 709/216 |
| 2011/0314155 A1 | 12/2011 | Narayanaswamy et al. | |
| 2013/0326181 A1 * | 12/2013 | Hom ..................... | G06F 3/0604 711/163 |

FOREIGN PATENT DOCUMENTS

WO    2013019185 A1    2/2013

OTHER PUBLICATIONS

Svard et al., "Evaluation of Delta Compression Techniques for Efficient Live Migration of Large Virtual Machines," VEE '11, Proceedings of the 7th ACM SIGPLAN/SIGOPS International Conference on Virtual Execution Environments, Mar. 9-11, 2011, Newport Beach, California, U.S.A., pp. 111-120.

(Continued)

*Primary Examiner* — Chat Do
*Assistant Examiner* — Jae Jeon
(74) *Attorney, Agent, or Firm* — Robert A. Voigt, Jr.; Winstead, P.C.

(57) ABSTRACT

A method, system and computer program product for selecting virtual machines to be migrated. The page consumption is monitored and recorded for each virtual machine running on a physical machine in a cloud computing node. Those virtual machines with a positive gradient of page consumption that is less than a threshold are placed in a list of virtual machines to be ranked. The virtual machines in the list are ranked based on an increasing order of the relative page consumption value at each sample interval within an observation window of time. A final rank for each virtual machine in the list is computed based on averaging its ranking across each sample interval within the observation window of time. One or more virtual machines are then selected to be migrated to another physical machine that have the lowest final ranking (i.e., with the lowest relative page consumption values).

17 Claims, 8 Drawing Sheets

(56) References Cited

OTHER PUBLICATIONS

Venkatesha et al., "Survey of Virtual Machine Migration Techniques," http://www.academia.edu/760613/Survey_of_Virtual_Machine_Migration_Techniques, 2009, pp. 1-10.
Microsoft System Center, "Understanding Virtual Machine Placement and Ratings in VMM," Nov. 1, 2013, pp. 1-3.
Novell, "VM Life Cycle Management," http://www.novell.com/documentation/zen_orchestrator12/zos12_developer/data/ba8zns9.html, 2013, pp. 1-3.
Wood et al., "Black-box and Gray-box Strategies for Virtual Machine Migration," 4th USENIX Symposium on Networked Systems Design & Implementation, Apr. 11-13, 2007, pp. 229-242.
Zhao et al., "Dynamic Memory Balancing for Virtual Machines," VEE '09, Mar. 11-13, 2009, Washington, D.C., U.S.A., pp. 1-10.
Mell et al., "The NIST Definition of Cloud Computing," Special Publication 800-145, Sep. 2011, pp. 1-7.

\* cited by examiner

SELECTING VIRTUAL MACHINES TO BE RELOCATED BASED ON MEMORY VOLATILITY

TECHNICAL FIELD

The present invention relates generally to cloud computing, and more particularly to selecting virtual machines to be relocated, such as to balance cloud computing resources, based on memory volatility.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor in which one or more virtual machines in the user portions are run by the hypervisor.

Virtual machines that are running on the physical computer (also referred to as "physical machine," "compute machine" or "compute node") of the physical cloud computing node may need to be migrated or relocated to another physical compute machine in the same or different cloud computing node for various reasons, such as to balance the cloud computing resources or to perform a maintenance operation. For example, a compute machine may experience an increase in workload demand thereby requiring additional virtual machines to handle the increase in workload demand. Such virtual machines may be migrated from compute machine(s) that are experiencing a low workload demand. In another example, virtual machines may need to be migrated to another compute machine if a maintenance operation needs to be performed on the compute machine that is hosting the virtual machines.

In the process of migrating or relocating virtual machines from one physical compute machine to another compute machine, the contents of the virtual machine's physical memory as well as the virtual machine's disk drive utilized by the migrating virtual machine needs to be copied. Furthermore, the network address assigned to the migrated virtual machine needs to be reassigned. As a result, in the process of migrating or relocating virtual machines from one physical compute machine to another compute machine, a "shell virtual machine" is created with the same attributes as the migrating virtual machine. Existing disks utilized by the migrating virtual machine are mapped to both the hypervisor in the virtual machine's current compute machine and the hypervisor in the target compute machine. The contents of the physical memory utilized by the migrating virtual machine are copied to the target hypervisor using an iterative approach to recopy memory contents that have changed during the copy operation. Such an iterative approach to recopy memory contents that have changed during the copy operation may result in a longer duration of time in migrating virtual machines. Additionally, the network address of the migrating virtual machine is switched to the target compute machine. The source migrating virtual machine is then stopped and deleted.

However, there is not currently a means for selecting the optimal virtual machine to be migrated from one physical compute machine to another compute machine to lessen the duration of time in migrating virtual machines that takes into consideration the iterative approach to recopy memory contents that have changed during the copy operation.

BRIEF SUMMARY

In one embodiment of the present invention, a method for selecting virtual machines to be migrated comprises monitoring page consumption by each virtual machine running on a physical machine as a function of time, where the page consumption comprises an amount of virtual memory accessed. The method further comprises recording the page consumption by each virtual machine running on the physical machine at sample points in time within an observation window of time. The method additionally comprises computing a gradient of page consumption for each virtual machine running on the physical machine at each sample interval within the observation window of time, where each sample interval is a time duration between two consecutive sample points in time within the observation window of time. Furthermore, the method comprises identifying those virtual machines with a positive computed gradient of page consumption that is less than a threshold to be placed in a list of virtual machines to be ranked. Additionally, the method comprises computing a relative page consumption value for each virtual machine in the list of virtual machines to be ranked for each sample interval within the observation window of time, where the relative page consumption value indicates a change in a rate of the page consumption. In addition, the method comprises ranking the virtual machines in the list of virtual machines based on an increasing order of the relative page consumption value at each sample interval within the observation window of time. The method further comprises computing, by a processor, a final rank for each virtual machine in the list of virtual machines based on averaging its ranking across each sample interval within the observation window of time. The method additionally comprises selecting one or more virtual machines to be migrated from the list of virtual machines that have a lowest final ranking.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for selecting virtual machines to be migrated. In one embodiment of the present invention, the page consumption (referring to the amount of virtual memory accessed) is monitored and recorded for each virtual machine running on a physical machine (also referred to as a "compute node") in a cloud computing node. The gradient of page consumption for each virtual machine running on the physical machine is computed at each sample interval within an observation window of time, where each sample interval is a time duration between two consecutive sample points in time within the observation window of time. The gradient of page consumption refers to a vector-valued function that indicates the change in virtual memory accessed over the sample interval. A positive gradient of page consumption indicates an increase in page consumption. That is, a positive gradient of page consumption indicates an increase in virtual memory access. It may be opportune to select those virtual machines with the lowest memory volatility to be migrated since the contents of the physical memory utilized by the migrating virtual machine will be copied fewer iterative times during the copy operation due to having fewer changes in the memory contents during the copy operation. As a result, those virtual machines with a positive gradient of page consumption that is less than a threshold (percentage of sample intervals within the observation window of time that have a positive gradient of page consumption) are placed in a list of virtual machines to be ranked. A relative page consumption value for each virtual machine in the list of virtual machines to be ranked is computed for each sample interval within the observation window of time. The relative page consumption value indicates a change in the rate of page consumption. A higher relative page consumption value indicates a higher rate of change in the page consumption (i.e., a higher rate of memory volatility). Such an indication is one way of quantifying memory volatility for the virtual machines. The virtual machines in the list of virtual machines are ranked based on an increasing order of the relative page consumption value at each sample interval within the observation window of time. A higher ranked virtual machine has a higher relative page consumption value than a lower ranked virtual machine. A final rank for each virtual machine in the list of virtual machines to be ranked is computed based on averaging its ranking across each sample interval within the observation window of time. One or more virtual machines are then selected to be migrated to another physical machine that have the lowest final ranking (i.e., with the lowest relative page consumption values). Since, as discussed above, it may be opportune to select those virtual machines with the lowest memory volatility to be migrated, those virtual machine(s) with the lowest relative page consumption values, which indicate a rate of change in the rate of page consumption, are selected to be migrated. In this manner, the virtual machine(s) with the lowest memory volatility are selected to be migrated since the contents of the physical memory utilized by such virtual machines will be copied fewer iterative times during the copy operation thereby reducing the time duration in migrating the virtual machine(s) to a different physical machine.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Figure 1:
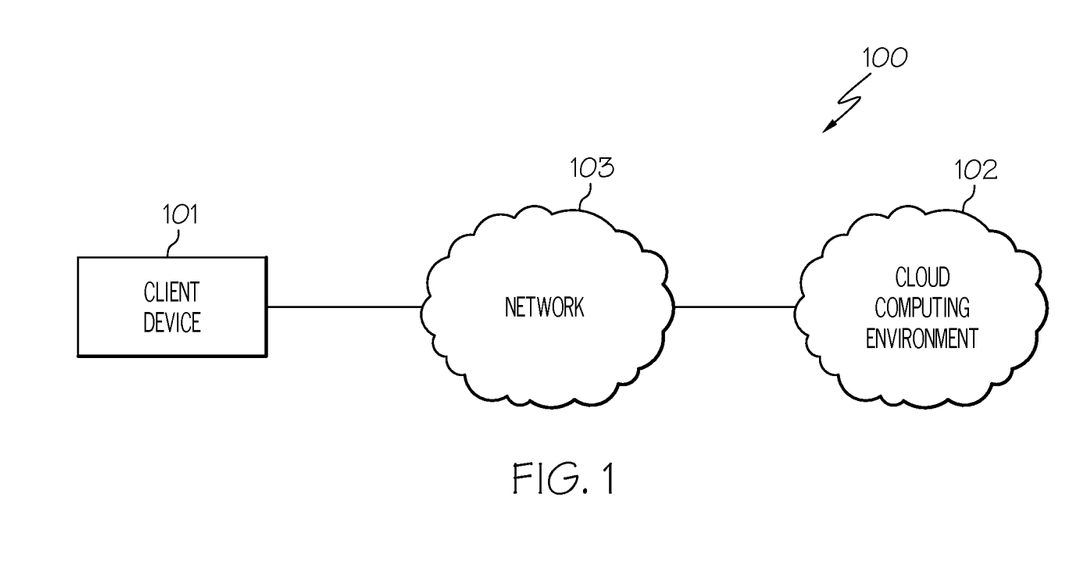
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
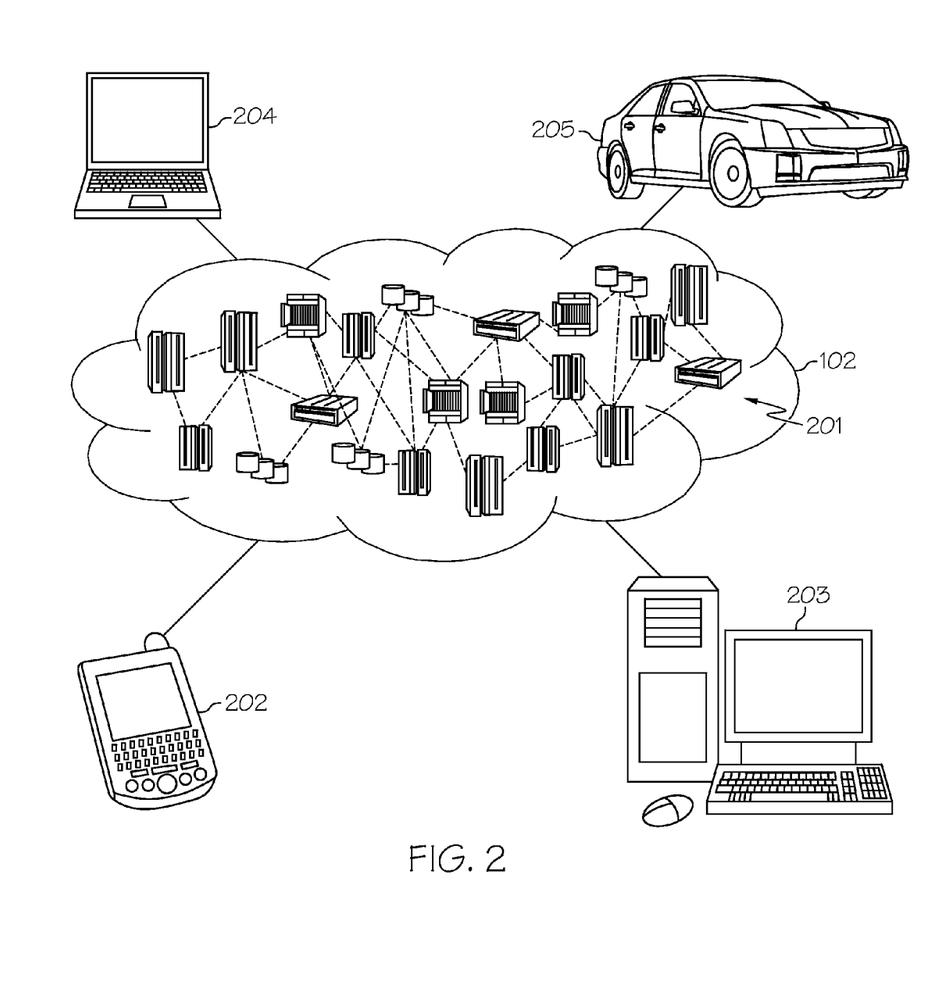
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 with which local computing devices used by cloud consumers, such as, for example, personal digital assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of an exemplary cloud computing node 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of the nodes 201 may be stored on a computer recordable storage medium in one of the nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
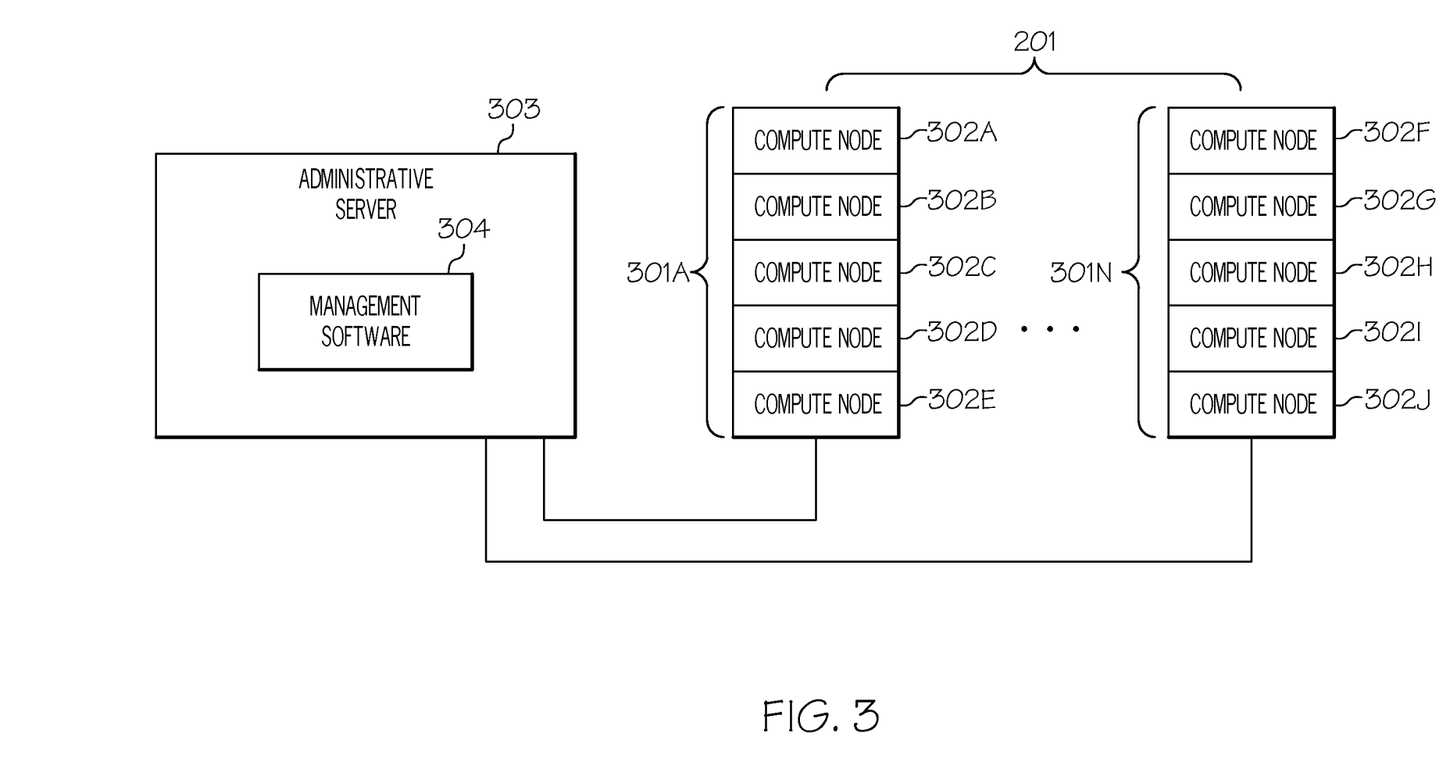
FIG. 3 illustrates a schematic of racks of compute nodes of a cloud computing node that are managed by an administrative server in accordance with an embodiment of the present invention.

Referring now to FIG. 3, FIG. 3 illustrates a schematic of racks of compute nodes (e.g., servers) of a cloud computing node 201 (FIG. 2) that are managed by an administrative server in accordance with an embodiment of the present invention.

As shown in FIG. 3, cloud computing node 201 may include racks 301A-301N, where N is a positive integer number, of hardware components or "compute nodes," such as servers or other electronic devices. For example, rack 301A houses compute nodes 302A-302E and rack 301N houses compute nodes 302F-302J. Racks 301A-301N may collectively or individually be referred to as a racks 301 or rack 301, respectively. Compute nodes 302A-302J may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, racks 301 are coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Management software 304 may further be configured to select the virtual machine(s) to be migrated based on memory volatility as discussed further below in connection with FIGS. 7-8. A description of the software components of management software 304 used to select the virtual machine(s) to be migrated based on memory volatility is discussed below in connection with FIG. 5. A description of the hardware configuration of administrative server 303 is provided further below in connection with FIG. 6.

Figure 4:
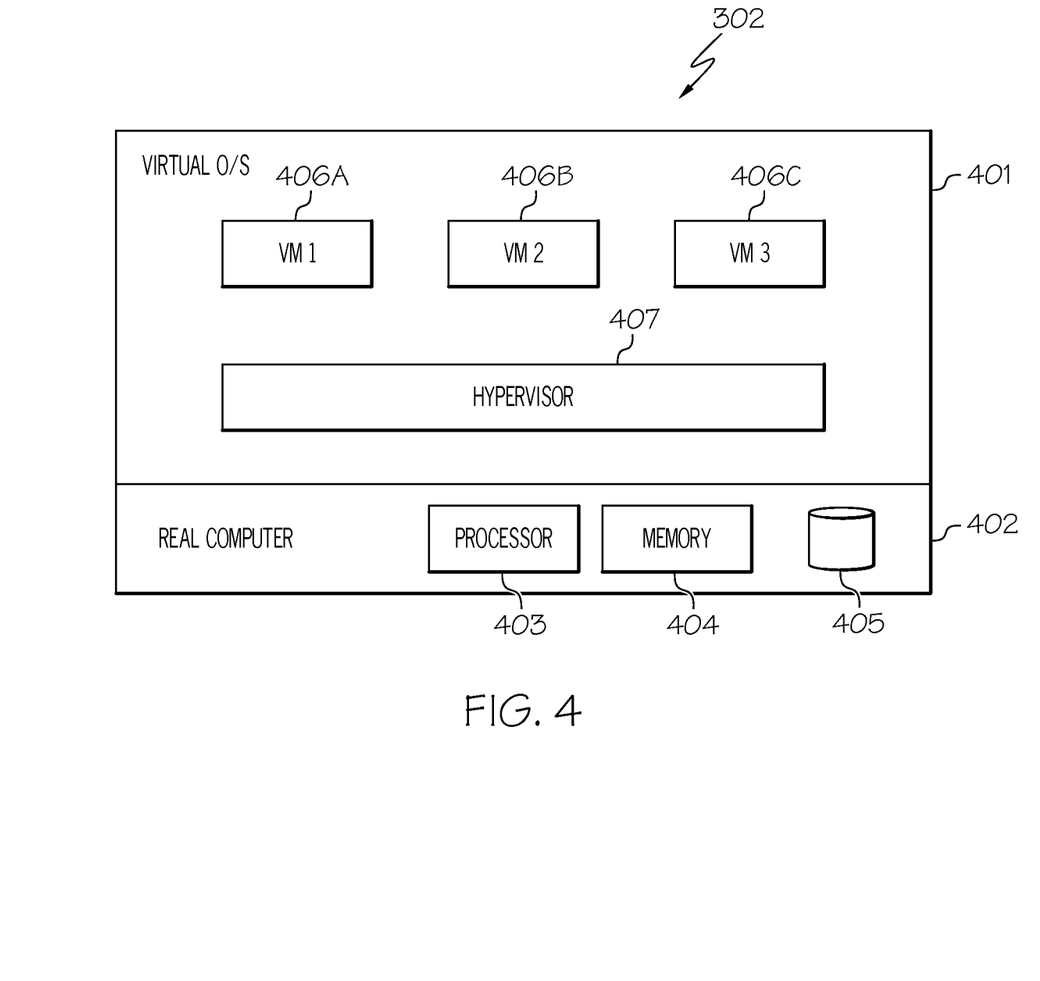
FIG. 4 illustrates a virtualization environment for the compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes one or more virtual machines 406A-406C (identified as "VM 1," "VM 2" and "VM 3," respectively, in FIG. 4) that are run by a hypervisor 407. Virtual machines 406A-406C may collectively or individually be referred to as virtual machines 406 or virtual machine 406, respectively. Hypervisor 407 may be implemented in microcode running on processor 403 or it may be implemented in software as part of virtual operating system 401.

As discussed above, virtual operating system 401 and its components execute on physical or real computer 402. These software components may be loaded into memory 404 for execution by processor 403.

Each compute node 302 may include any number of virtual machines 406, hypervisors 407, etc. Furthermore, the virtualization environment for compute node 302 is not to be limited in scope to the elements depicted in FIG. 4. The virtualization environment for compute node 302 may include other components that were not discussed herein for the sake of brevity.

Figure 5:
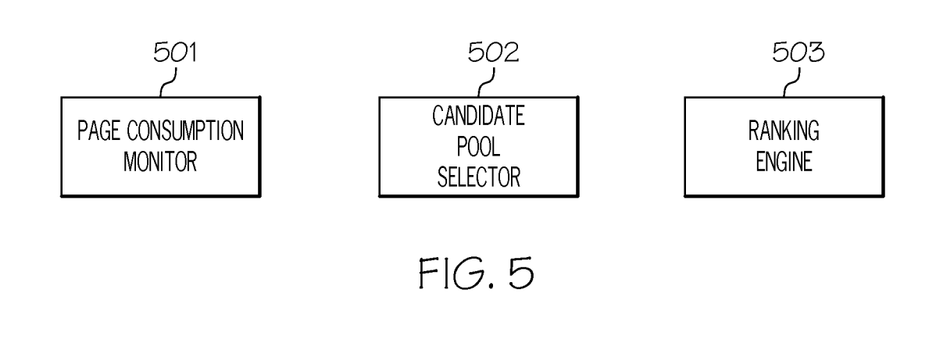
FIG. 5 illustrates the software components of the management software of the administrative server used in selecting the virtual machines to be migrated based on memory volatility in accordance with an embodiment of the present invention.

Referring now to FIG. 5, FIG. 5 illustrates the software components of management software 304 (FIG. 3) used in selecting the virtual machines to be migrated based on memory volatility in accordance with an embodiment of the present invention. In one embodiment, these software components are the components or modules of management software 304.

As illustrated in FIG. 5, in conjunction with FIGS. 3-4, the software components of management software 304 include a page consumption monitor 501. Page consumption monitor 501 is configured to monitor and record the page consumption by each virtual machine 406 running on compute node 302, where the "page consumption," as used herein, refers to the amount of virtual memory accessed by virtual machine 406. Additional details regarding the functionality of page consumption monitor 501 is provided below in connection with FIGS. 7 and 8.

Furthermore, the software components of management software 304 include a candidate pool selector 502 configured to compute a gradient of page consumption for each virtual machine 406 running on compute node 302 and identify those virtual machines 406 with a positive gradient of page consumption that is less than a threshold (e.g., percentage of sample intervals within an observation window of time that have a positive gradient of page consumption) to be placed in a list of virtual machines to be ranked. The gradient of page consumption refers to a vector-valued function that indicates the change in virtual memory accessed over a sample interval. A positive gradient of page consumption indicates an increase in page consumption. That is, a positive gradient of page consumption indicates an increase in virtual memory access. As will be discussed further below, it may be opportune to select those virtual machines 406 with the lowest memory volatility to be migrated since the contents of the physical memory (e.g., memory 404) utilized by the migrating virtual machine 406 will be copied fewer iterative times during the copy operation due to having fewer changes in the memory contents during the copy operation. As a result, those virtual machines 406 with a positive gradient of page consumption that exceeds a threshold period of time (e.g., 80% of the sample intervals) will be excluded from being in the list of possible virtual machines 406 to be migrated. Additional details regarding the functionality of candidate pool selector 502 is provided below in connection with FIGS. 7 and 8.

Additionally, the software components of management software 304 include a ranking engine 503 configured to compute a relative page consumption value for each virtual machine 406 in the list of virtual machines to be ranked for each sample interval within the observation window of time, where the relative page consumption value indicates a change in a rate of the page consumption. A higher relative page consumption value indicates a higher rate of change in the page consumption (i.e., a higher rate of memory volatility). Such an indication is one way of quantifying memory volatility for virtual machines 406. Ranking engine 503 ranks virtual machines 406 in the list of virtual machines at each sample interval within the observation window of time and then computes a final rank for each virtual machine 406 in the list of virtual machines based on averaging its ranking across each sample interval within the observation window of time. One or more virtual machines 406 may then be selected from the list of virtual machines with the lowest final ranking Since, as discussed above, it may be opportune to select those virtual machines 406 with the lowest memory volatility to be migrated, those virtual machine(s) 406 with the lowest relative page consumption values, which indicate a rate of change in the rate of page consumption, are selected to be migrated.

Additional details regarding the functionality of ranking engine 503 is provided below in connection with FIGS. 7 and 8.

Figure 6:
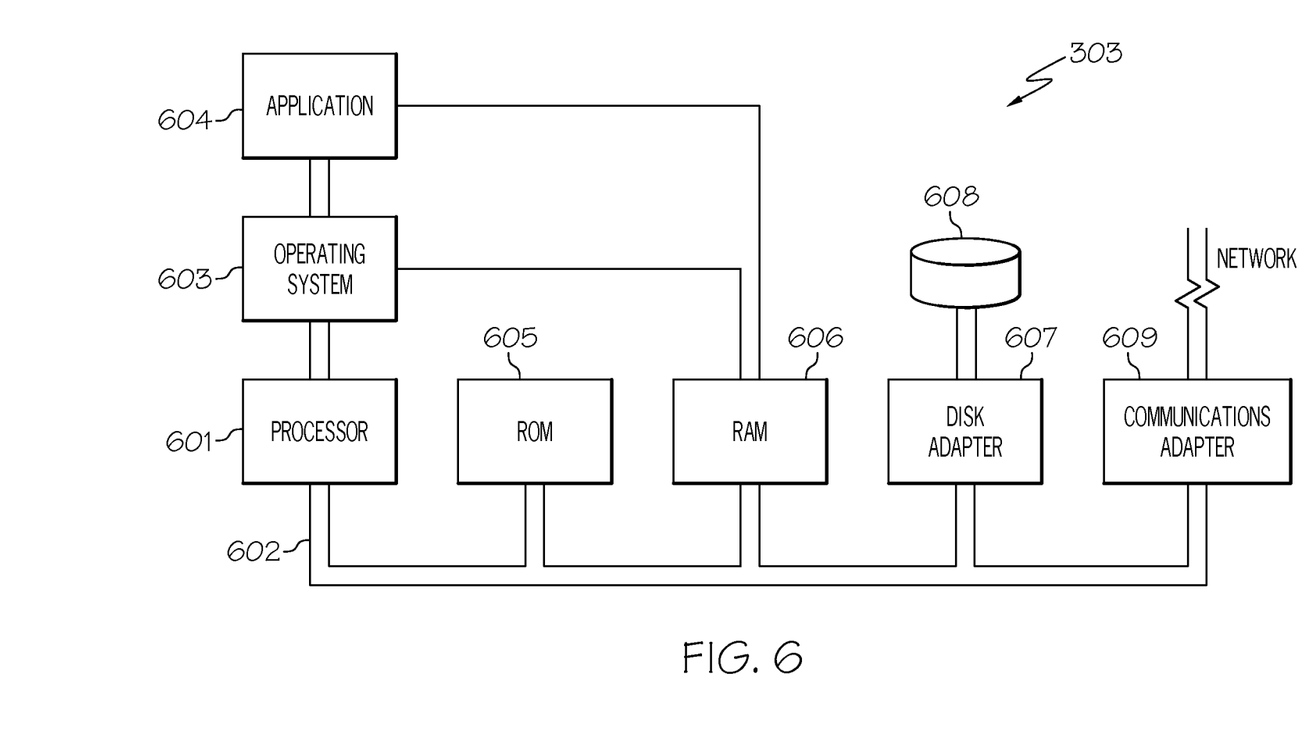
FIG. 6 illustrates a hardware configuration of the administrative server configured in accordance with an embodiment of the present invention.

Referring now to FIG. 6, FIG. 6 illustrates a hardware configuration of administrative server 303 (FIG. 3) which is representative of a hardware environment for practicing the present invention. Administrative server 303 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program (e.g., management software 304 of FIGS. 3 and 5) for selecting the virtual machine(s) 406 to be migrated based on memory volatility as discussed further below in association with FIGS. 7 and 8.

Referring again to FIG. 6, read-only memory ("ROM") 605 is coupled to system bus 602 and includes a basic input/output system ("BIOS") that controls certain basic functions of administrative server 303. Random access memory ("RAM") 606 and disk adapter 607 are also coupled to system bus 602. It should be noted that software components including operating system 603 and application 604 may be loaded into RAM 606, which may be administrative server's 303 main memory for execution. Disk adapter 607 may be an integrated drive electronics ("IDE") adapter that communicates with a disk unit 608, e.g., disk drive. It is noted that the program for selecting the virtual machine(s) 406 to be migrated based on memory volatility, as discussed further below in association with FIGS. 7 and 8, may reside in disk unit 608 or in application 604.

Administrative server 303 may further include a communications adapter 609 coupled to bus 602. Communications adapter 609 interconnects bus 602 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, virtual machines that are running on the physical computer (also referred to as "physical machine," "compute machine" or "compute node") of the physical cloud computing node may need to be migrated or relocated to another physical compute machine in the same or different cloud computing node for various reasons, such as to balance the cloud computing resources or to perform a maintenance operation. In the process of migrating or relocating virtual machines from one physical compute machine to another compute machine, the contents of the virtual machine's physical memory as well as the virtual machine's disk drive utilized by the migrating virtual machine needs to be copied. Furthermore, the network address assigned to the migrated virtual machine needs to be reassigned. As a result, in the process of migrating or relocating virtual machines from one physical compute machine to another compute machine, a "shell virtual machine" is created with the same attributes as the migrating virtual machine. Existing disks utilized by the migrating virtual machine are mapped to both the hypervisor in the virtual machine's current compute machine and the hypervisor in the target compute machine. The contents of the physical memory utilized by the migrating virtual machine are copied to the target hypervisor using an iterative approach to recopy memory contents that have changed during the copy operation. Such an iterative approach to recopy memory contents that have changed during the copy operation may result in a longer duration of time in migrating virtual machines. Additionally, the network address of the migrating virtual machine is switched to the target compute machine. The source migrating virtual machine is then stopped and deleted. However, there is not currently a means for selecting the optimal virtual machine to be migrated from one physical compute machine to another compute machine to lessen the duration of time in migrating virtual machines that takes into consideration the iterative approach to recopy memory contents that have changed during the copy operation.

The principles of the present invention provide a means for selecting those virtual machine(s) to be migrated based on memory volatility thereby taking into consideration the duration of time spent in iteratively recopying the memory contents during the copy operation. As will be discussed further below, it may be opportune to select those virtual machines with the lowest memory volatility to be migrated since the contents of the physical memory utilized by the migrating virtual machine will be copied fewer iterative times during the copy operation due to having fewer changes in the memory contents during the copy operation. A discussion of selecting those virtual machines based on memory volatility is provided below in connection with FIGS. 7 and 8. FIG. 7 is a flowchart of a method for selecting virtual machine(s) 406 (FIG. 4) to be migrated based on memory volatility. FIG. 8 is a graph depicting the sampling of the page consumption for each virtual machine 406 running on compute node 302 (FIGS. 3 and 4) at particular sample points in time within an observation window of time.

Figure 7:
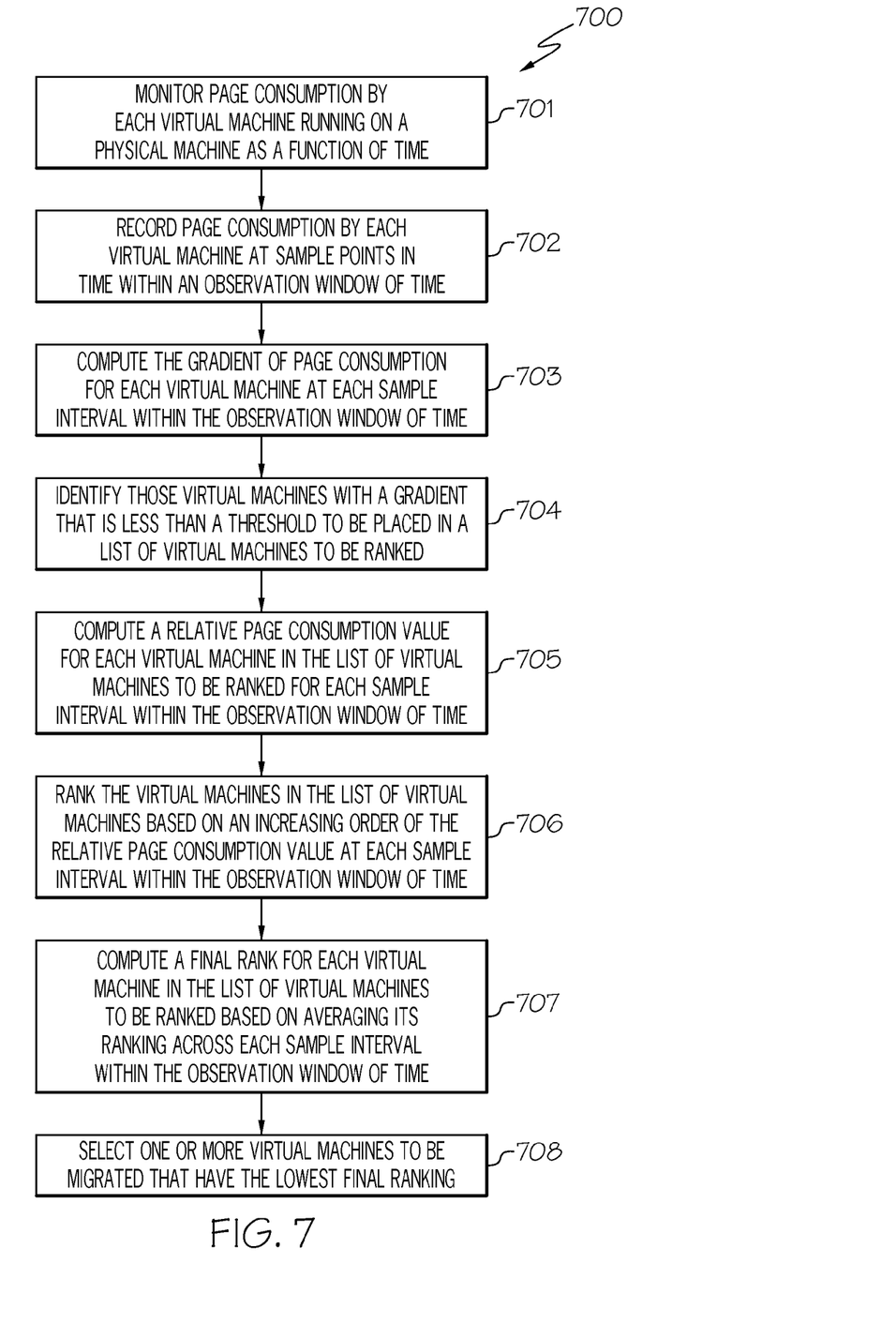
FIG. 7 is a flowchart of a method for selecting virtual machine(s) to be migrated based on memory volatility in accordance with an embodiment of the present invention.

FIG. 7 is a flowchart of method 700 for selecting virtual machine(s) 406 (FIG. 4) to be migrated based on memory volatility in accordance with an embodiment of the present invention. "Migrating," as used herein, may refer to relocating or creating a replication of the virtual machine instance 406 running in compute node 302 (FIGS. 3 and 4).

Referring now to FIG. 7, in conjunction with FIGS. 1-6, in step 701, page consumption monitor 501 monitors the page consumption by each virtual machine 406 running on compute node 302 (also may be referred to as "physical machine") as a function of time, where the page consumption refers to an amount of virtual memory accessed.

Figure 8:
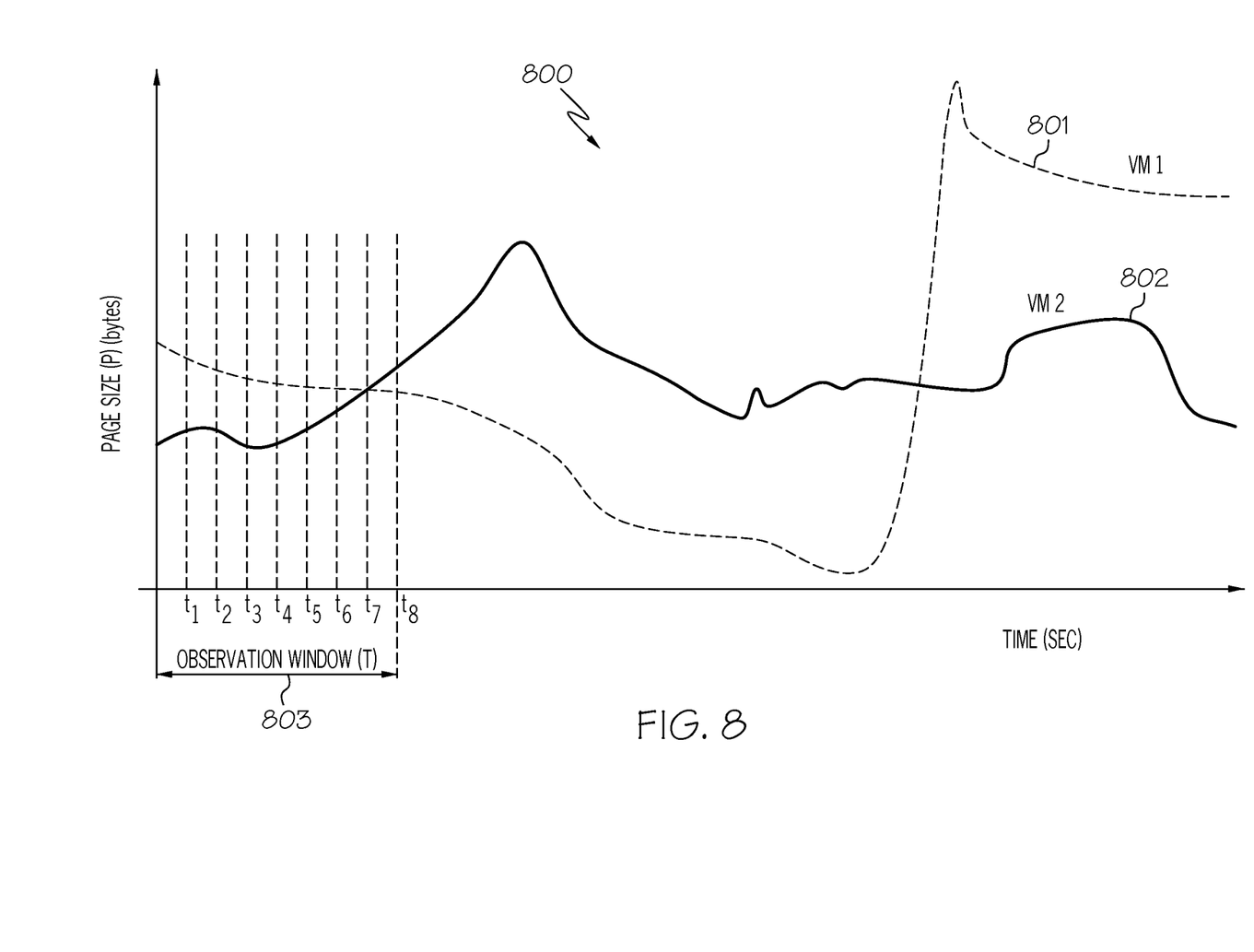
FIG. 8 is a graph depicting the sampling of the page consumption for each virtual machine running on the compute node at particular sample points in time within an observation window of time in accordance with an embodiment of the present invention.

In step 702, page consumption monitor 501 records the amount of virtual memory accessed (i.e., page consumption) by each virtual machine 406 running on compute node 302 at sample points in time within an observation window of time as illustrated in FIG. 8.

Referring to FIG. 8, FIG. 8 is a graph 800 depicting the sampling of the page consumption for each virtual machine 406 running on compute node 302 (FIGS. 3 and 4) at particular sample points in time within an observation window of time in accordance with an embodiment of the present invention.

As illustrated in FIG. 8, graph 800 depicts the page consumption behavior for two virtual machines 406 (e.g., virtual machines 406A, 406B) over a period of time as shown in lines 801, 802 based on recording the amount of virtual memory accessed (page size), such as in bytes, at particular points in time (e.g., $t_1, t_2 \ldots t_8$) within one or more observation windows of times 803.

Returning to FIG. 7, in conjunction with FIGS. 1-6 and 8, in step 703, candidate pool selector 502 computes the gradient of page consumption for each virtual machine 406 running on compute node 302 at each sample interval within observation window of time 803, where each sample interval is a time duration between two consecutive sample points in time (e.g., $t_1$ and $t_2$ of FIG. 8) within observation window of time 803. In one embodiment, the gradient of page consumption for each virtual machine 406 running on compute node 302 is calculated using the following equation:

$$\frac{\Delta P_{i,i-1}}{\Delta t_{i,i-1}} = \frac{P_i - P_{i-1}}{t_i - t_{i-1}} \quad \text{(EQ 1)}$$

where P represents a page consumption value, i represents a sample point within observation window of time 803, and t represents a time of a sample point (e.g., $t_1$ of FIG. 8) within observation window of time 803.

The gradient of page consumption refers to a vector-valued function that indicates the change in virtual memory accessed over a sample interval. A positive gradient of page consumption indicates an increase in page consumption. That is, a positive gradient of page consumption indicates an increase in virtual memory access. As previously discussed, it may be opportune to select those virtual machines 406 with the lowest memory volatility to be migrated since the contents of the physical memory (e.g., memory 404) utilized by the migrating virtual machine 406 will be copied fewer iterative times during the copy operation due to having fewer changes in the memory contents during the copy operation. As a result, those virtual machines 406 with a positive gradient of page consumption that exceeds a threshold period of time (e.g., 80% of the sample intervals) will be excluded from being in the list of possible virtual machines 406 to be migrated as discussed further below.

In step 704, candidate pool selector 502 identifies those virtual machines 406 running on compute node 302 with a gradient of page consumption that is less than a threshold to be placed in a list of virtual machines to be ranked. Such a threshold may correspond to a percentage (e.g., 80%) of sample intervals within observation window of time 803 that have a positive gradient of page consumption. Since a high percentage of sample intervals within observation window of time 803 that have a positive gradient of page consumption indicates a high number of increases in virtual memory accesses, it may be opportune to select those virtual machines 406 with a low percentage of sample intervals within observation window of time 803 that have a positive gradient of page consumption. As a result, those virtual machines 406 running on compute node 302 with a gradient of page consumption that is less than a threshold are placed in a list of virtual machines to be ranked.

In step 705, ranking engine 503 computes a relative page consumption value for each virtual machine 406 in the list of virtual machines to be ranked for each sample interval within observation window of time 803. The relative page consumption value indicates a change in the rate of page consumption. In one embodiment, the relative page consumption value for each virtual machine 406 running on compute node 302 is calculated using the following equation:

$$RPC_{i,i-1} = \frac{\Delta P_{i,i-1}}{P_{i-1}} = \frac{P_i - P_{i-1}}{P_{i-1}}$$

where RPC represents the relative page consumption value, P represents a page consumption value, and i represents a sample point (e.g., $t_1$ of FIG. 8) within observation window of time 803.

A higher relative page consumption value indicates a higher rate of change in the page consumption (i.e., a higher rate of memory volatility). Such an indication is one way of quantifying memory volatility for virtual machines 406.

In step 706, ranking engine 503 ranks virtual machines 406 in the list of virtual machines based on an increasing order of the relative page consumption value at each sample interval (e.g., time between $t_1$ and $t_2$ of FIG. 8) within observation window of time 803. A higher ranked virtual machine 406 has a higher relative page consumption value than a lower ranked virtual machine 406.

In step 707, ranking engine 503 computes a final rank for each virtual machine 406 in the list of virtual machines to be ranked based on averaging its ranking across each sample interval (e.g., time between $t_1$ and $t_2$ of FIG. 8) within observation window of time 803.

In step 708, ranking engine 503 selects one or more virtual machines 406 from compute node 302 (e.g., compute node 302A) to be migrated to another compute node 302 (e.g., compute node 302F) that have the lowest final ranking (i.e., with the lowest relative page consumption values). Since, as discussed above, it may be opportune to select those virtual machines 406 with the lowest memory volatility to be migrated, those virtual machine(s) 406 with the lowest relative page consumption values, which indicate a rate of change in the rate of page consumption, are selected to be migrated. In this manner, virtual machine(s) 406 with the lowest memory volatility are selected to be migrated since the contents of the physical memory utilized by such virtual machines 406 will be copied fewer iterative times during the copy operation thereby reducing the time duration in migrating virtual machine(s) 406 to a different compute node 302. In one embodiment, the target compute node 302 (i.e., the compute node 302 receiving the migrated virtual machine 406) resides on the same cloud computing node 201 as the source compute node 302 (i.e., the compute node 302 that is the source of the migrating virtual machine 406). In another embodiment, the target compute node 302 (i.e., the compute node 302 receiving the migrated virtual machine 406) resides on a different cloud computing node 201 as the source compute node 302 (i.e., the compute node 302 that is the source of the migrating virtual machine 406).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for selecting virtual machines to be migrated, the method comprising:

monitoring page consumption by each virtual machine running on a physical machine as a function of time, wherein said page consumption comprises an amount of virtual memory accessed;

recording said page consumption by each virtual machine running on said physical machine at sample points in time within an observation window of time;

computing a gradient of page consumption for each virtual machine running on said physical machine at each sample interval within said observation window of time, wherein each said sample interval is a time duration between two consecutive sample points in time within said observation window of time;

identifying those virtual machines with a positive computed gradient of page consumption that is less than a threshold to be placed in a list of virtual machines to be ranked, wherein said threshold comprises a percentage of sample intervals within said observation window of time that have a positive gradient of page consumption;

computing a relative page consumption value for each virtual machine in said list of virtual machines to be ranked for each said sample interval within said observation window of time, wherein said relative page consumption value indicates a change in a rate of said page consumption;

ranking said virtual machines in said list of virtual machines based on an increasing order of said relative page consumption value at each said sample interval within said observation window of time;

computing, by a processor, a final rank for each virtual machine in said list of virtual machines based on averaging its ranking across each said sample interval within said observation window of time; and selecting one or more virtual machines to be migrated from said list of virtual machines that have a lowest final ranking.

2. The method as recited in claim 1, wherein said gradient of page consumption at each said sample interval within said observation window of time is computed using the following equation:

$$\frac{\Delta P_{i,i-1}}{\Delta t_{i,i-1}} = \frac{P_i - P_{i-1}}{t_i - t_{i-1}}$$

where P represents a page consumption value, i represents a sample point within said observation window of time, and t represents a time of a sample point within said observation window of time.

3. The method as recited in claim 1, wherein said relative page consumption value is computed using the following equation:

$$RPC_{i,i-1} = \frac{\Delta P_{i,i-1}}{P_{i-1}} = \frac{P_i - P_{i-1}}{P_{i-1}}$$

where RPC represents said relative page consumption value, P represents a page consumption value, and i represents a sample point within said observation window of time.

4. The method as recited in claim 1, wherein said one or more virtual machines selected to be migrated from said list of virtual machines that have said lowest final ranking are migrated to a different physical machine from said physical machine.

5. The method as recited in claim 4, wherein said different physical machine resides on a same cloud computing node of a cloud computing environment as said physical machine.

6. The method as recited in claim 4, wherein said different physical machine resides on a different cloud computing node of a cloud computing environment as said physical machine.

7. A computer program product for selecting virtual machines to be migrated, the computer program product comprising a computer readable storage medium having program code embodied therewith, the program code comprising the programming instructions for:

monitoring page consumption by each virtual machine running on a physical machine as a function of time, wherein said page consumption comprises an amount of virtual memory accessed;

recording said page consumption by each virtual machine running on said physical machine at sample points in time within an observation window of time;

computing a gradient of page consumption for each virtual machine running on said physical machine at each sample interval within said observation window of time, wherein each said sample interval is a time duration between two consecutive sample points in time within said observation window of time;

identifying those virtual machines with a positive computed gradient of page consumption that is less than a threshold to be placed in a list of virtual machines to be ranked, wherein said threshold comprises a percentage of sample intervals within said observation window of time that have a positive gradient of page consumption;

computing a relative page consumption value for each virtual machine in said list of virtual machines to be ranked for each said sample interval within said observation window of time, wherein said relative page consumption value indicates a change in a rate of said page consumption;

ranking said virtual machines in said list of virtual machines based on an increasing order of said relative page consumption value at each said sample interval within said observation window of time;

computing a final rank for each virtual machine in said list of virtual machines based on averaging its ranking across each said sample interval within said observation window of time; and selecting one or more virtual machines to be migrated from said list of virtual machines that have a lowest final ranking.

8. The computer program product as recited in claim 7, wherein said gradient of page consumption at each said sample interval within said observation window of time is computed using the following equation:

$$\frac{\Delta P_{i,i-1}}{\Delta t_{i,i-1}} = \frac{P_i - P_{i-1}}{t_i - t_{i-1}}$$

where P represents a page consumption value, i represents a sample point within said observation window of time, and t represents a time of a sample point within said observation window of time.

9. The computer program product as recited in claim 7, wherein said relative page consumption value is computed using the following equation:

$$RPC_{i,i-1} = \frac{\Delta P_{i,i-1}}{P_{i-1}} = \frac{P_i - P_{i-1}}{P_{i-1}}$$

where RPC represents said relative page consumption value, P represents a page consumption value, and i represents a sample point within said observation window of time.

10. The computer program product as recited in claim 7, wherein said one or more virtual machines selected to be migrated from said list of virtual machines that have said lowest final ranking are migrated to a different physical machine from said physical machine.

11. The computer program product as recited in claim 10, wherein said different physical machine resides on a same cloud computing node of a cloud computing environment as said physical machine.

12. The computer program product as recited in claim 10, wherein said different physical machine resides on a different cloud computing node of a cloud computing environment as said physical machine.

13. A system, comprising:

a memory unit for storing a computer program for selecting virtual machines to be migrated; and a processor coupled to the memory unit, wherein the processor is configured to execute the program instructions of the computer program comprising:

monitoring page consumption by each virtual machine running on a physical machine as a function of time, wherein said page consumption comprises an amount of virtual memory accessed;

recording said page consumption by each virtual machine running on said physical machine at sample points in time within an observation window of time;

computing a gradient of page consumption for each virtual machine running on said physical machine at each sample interval within said observation window of time, wherein each said sample interval is a time duration between two consecutive sample points in time within said observation window of time;

identifying those virtual machines with a positive computed gradient of page consumption that is less than a threshold to be placed in a list of virtual machines to be ranked, wherein said threshold comprises a percentage of sample intervals within said observation window of time that have a positive gradient of page consumption;

computing a relative page consumption value for each virtual machine in said list of virtual machines to be ranked for each said sample interval within said observation window of time, wherein said relative page consumption value indicates a change in a rate of said page consumption;

ranking said virtual machines in said list of virtual machines based on an increasing order of said relative page consumption value at each said sample interval within said observation window of time;

computing a final rank for each virtual machine in said list of virtual machines based on averaging its ranking across each said sample interval within said observation window of time; and selecting one or more virtual machines to be migrated from said list of virtual machines that have a lowest final ranking.

14. The system as recited in claim 13, wherein said gradient of page consumption at each said sample interval within said observation window of time is computed using the following equation:

$$\frac{\Delta P_{i,i-1}}{\Delta t_{i,i-1}} = \frac{P_i - P_{i-1}}{t_i - t_{i-1}}$$

where P represents a page consumption value, i represents a sample point within said observation window of time, and t represents a time of a sample point within said observation window of time.

15. The system as recited in claim 13, wherein said relative page consumption value is computed using the following equation:

$$RPC_{i,i-1} = \frac{\Delta P_{i,i-1}}{P_{i-1}} = \frac{P_i - P_{i-1}}{P_{i-1}}$$

where RPC represents said relative page consumption value, P represents a page consumption value, and i represents a sample point within said observation window of time.

16. The system as recited in claim 13, wherein said one or more virtual machines selected to be migrated from said list of virtual machines that have said lowest final ranking are migrated to a different physical machine from said physical machine, wherein said different physical machine resides on a same cloud computing node of a cloud computing environment as said physical machine.

17. The system as recited in claim 13, wherein said one or more virtual machines selected to be migrated from said list of virtual machines that have said lowest final ranking are migrated to a different physical machine from said physical machine, wherein said different physical machine resides on a different cloud computing node of a cloud computing environment as said physical machine.

* * * * *